(12) United States Patent
Pollock

(10) Patent No.: US 6,712,021 B2
(45) Date of Patent: Mar. 30, 2004

(54) WATER PRESSURE REGULATOR

(75) Inventor: Eugene B. Pollock, Assumption, IL (US)

(73) Assignee: The GSI Group, Inc., Assumption, IL (US)

( * ) Notice: Subject to any disclaimer, the term of this patent is extended or adjusted under 35 U.S.C. 154(b) by 0 days.

(21) Appl. No.: 10/023,531

(22) Filed: Dec. 18, 2001

(65) Prior Publication Data

US 2003/0111019 A1 Jun. 19, 2003

(51) Int. Cl.$^7$ ................................................ A01K 7/00
(52) U.S. Cl. ........................................................ 119/72
(58) Field of Search ............................ 119/72, 72.5, 74, 119/75; 137/495, 505.46

(56) References Cited

U.S. PATENT DOCUMENTS

| | | |
|---|---|---|
| 4,421,061 A | 12/1983 | Shomer |
| 4,852,522 A | 8/1989 | Uri |
| 4,991,621 A | 2/1991 | Steudler, Jr. |
| 5,070,903 A * | 12/1991 | Steudler, Jr. ........... 137/505.46 |
| 5,074,250 A | 12/1991 | Clark, IV |
| 5,174,331 A * | 12/1992 | Steudler, Jr. ........... 137/505.46 |
| 5,429,072 A | 7/1995 | Schumacher |
| 5,522,346 A | 6/1996 | Clark, IV |
| 5,735,306 A * | 4/1998 | Olds et al. ................ 137/116.5 |
| 5,765,588 A * | 6/1998 | Katz ........................... 137/238 |
| 5,771,921 A | 6/1998 | Johnson |
| 5,870,970 A | 2/1999 | Katz |
| 5,967,181 A | 10/1999 | Momont et al. |
| 6,098,959 A | 8/2000 | Momont et al. |
| 6,202,682 B1 * | 3/2001 | Johnson ....................... 137/495 |
| 6,431,205 B1 * | 8/2002 | Bartos ................... 137/505.46 |

* cited by examiner

*Primary Examiner*—Thomas Price
(74) *Attorney, Agent, or Firm*—Polster, Lieder, Woodruff & Lucchesi L.C.

(57) ABSTRACT

A diaphragm operated water pressure regulator switchable between an operating mode and a flushing mode by changing the relative positions of the water inlet port and the valve in the regulator. By moving the port to a position in which the valve cannot close the inlet port, water at full line pressure enters the watering system to flush the system. A mounting bracket is also disclosed which independently suspends the regulator and a support pipe from a cable in the poultry house such that the regulator can be removed from the watering system without affecting the support pipe.

20 Claims, 11 Drawing Sheets

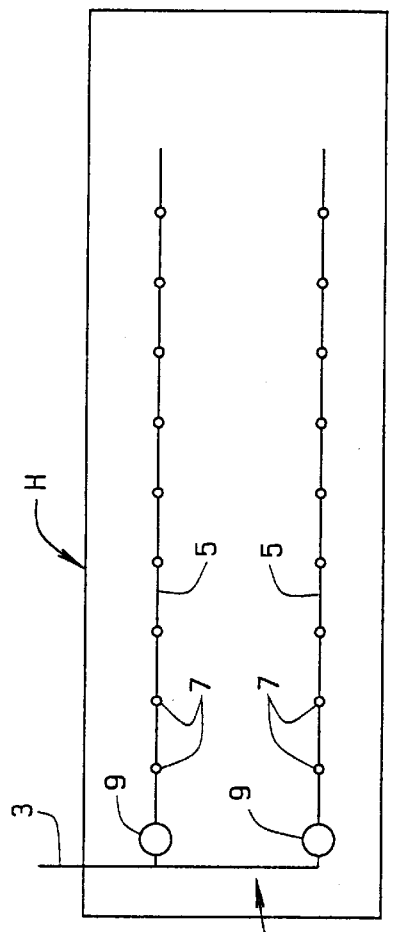
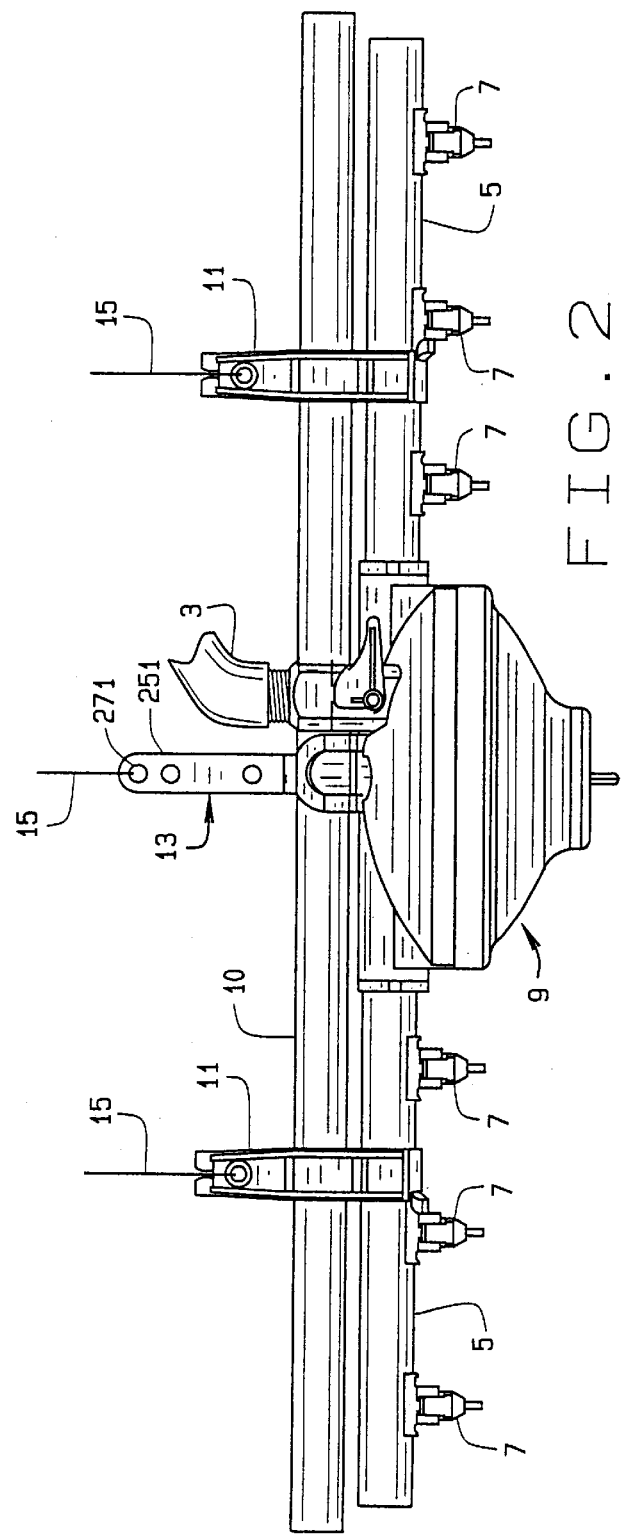

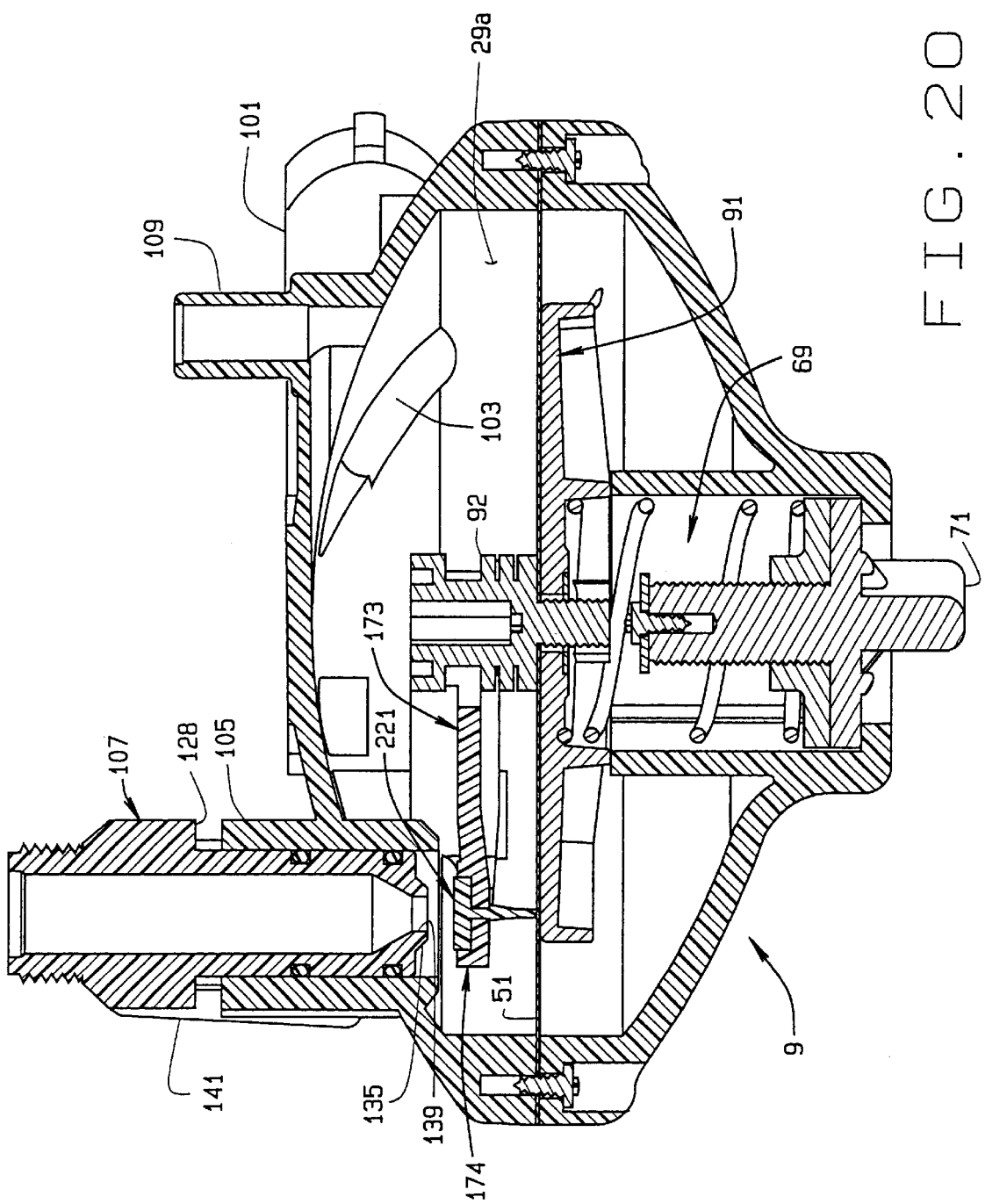

WATER PRESSURE REGULATOR

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates to a water pressure regulator, and in particular, to a water regulator for use in a drinking system in a poultry house which allows for the water regulator, and the drinking system of the poultry house, to be switched between a low pressure operational mode and a higher pressure flushing mode.

Drinking or watering systems for poultry houses are supplied with water at relatively high line pressure (e.g., 30–60 psi). The water is delivered at lower pressure to a watering line extending the length of a poultry house or the like. The watering line has a series of spaced apart watering stations or drinkers therealong at which birds can get water by pecking at a movable pin or lever. One such watering station is shown for example in U.S. Pat. Nos. 5,522,346 and 5,074,250, both to Clark. For the drinkers to operate properly, the water pressure in the watering line must be reduced to only a few inches of water (i.e., less than 6"–12" of $H_2O$). Typically, in order to reduce the water pressure, the water passes though a regulator before entering the water line which leads to the drinking stations.

The water in the drinking system may be hard well water. That is, it may contain minerals and solid particles which settle or precipitate out in the pipes and the regulator. Additionally, the chickens are provided with medication and nutritional supplements (such as vitamins) through the water. These supplements can also settle out or be deposited in the drinking system. Thus, it is advantageous that the drinking system be flushed out periodically to prevent the various minerals and particles from accumulating in the regulator and drinking stations, and thus possibly interfering with the operation of the regulator and the drinking stations.

In a typical regulator, the regulator includes a first port which is used to regulate water pressure and a second port which is opened to flush out the drinking system. This second port can be either an internal or external bypass, or simply a second port in the inlet pipe. For example U.S. Pat. No. 5,771,921 to Johnson discloses a complex system to isolate the diaphragm of the regulator from the higher pressure water by directing high-pressure flushing water through a different port than the low pressure water passes.

U.S. Pat. No. 4,991,621 to Steudler, Jr. discloses flushing of the watering system by uncoupling the supply hose from the water inlet, and reconnecting it to the regulator's standpipe. This is another way of using a second port to by-pass the valving mechanism which controls the pressure in the watering system. Additionally, the need to uncouple the supply line from the inlet to connect it the stand pipe to flush the system, and then to uncouple the supply line from the stand pipe to reconnect the supply line to the inlet is time consuming. As can be appreciated, when the second port is closed, the water is directed through the first port, and the water pressure is regulated down to the desired pressure. When the second port is opened, the water enters the drinking system at line pressure, and the higher water pressure will flush the system out.

The use of two-port systems creates several problems. First, it adds complexity to the manufacture of the regulator. Second, it requires multiple sets of seals, which will degrade over time. Hence, maintenance costs are increased due to the use of the second port.

U.S. Pat. No. 5,429,072 to Schumacher discloses a water pressure reducer or regulator with a valve in the water inlet which when opened allows line pressure to flow through a second opening so as to by-pass the regulator valve. Thus, full line pressure will flow through the regulator and the watering line thereby to flush these components.

Another shortcoming of the known prior art regulators is the manner in which they are suspended from the roof rafters within a poultry house. As previously described, a poultry watering system includes a watering pipe having a series of spaced drinkers spaced along its length. This watering pipe, which may be several hundred feet in length, has, at spaced intervals along its length (e.g., 6–10 feet), cables suspending the watering pipe from a winch arrangement. In order to stabilize and to stiffen the water pipe, a stabilizing or stiffening tube (or other stiffening member) is vertically spaced above the watering tube and is fastened (clamped) to the watering pipe. With prior art water regulators, such as shown in U.S. Pat. No. 5,070,903 to Steudler, the stabilizing pipe is clamped to the housing of the regulator. This, however, makes it difficult to remove the regulator from the watering system.

BRIEF SUMMARY OF THE INVENTION

Briefly stated, a pressure regulator of the present invention for a drinking system for poultry or other animals includes a water supply line, the regulator, and a watering pipe with drinking stations positioned therealong. The pressure regulator includes a housing having a chamber therewithin which is divided into a water chamber and an ambient chamber by a flexible diaphragm sealed with respect to the housing. A spring is carried by the housing in operable engagement with the diaphragm such that the force of the spring and the force of the atmosphere in the ambient chamber act upon the diaphragm to force the diaphragm toward the water chamber. The housing has a water inlet adapted to be connected to a supply line and an outlet adapted to be connected to the watering pipe. Importantly, the inlet has a single inlet port through which water enters the water chamber. A valve is carried by the housing and is operatively associated with the diaphragm for movement between a closed position in which the valve blocks the flow of water from the inlet port into the water chamber and an open position in which water is permitted to flow from the inlet port into the water chamber such that the force of the spring acting on the atmosphere side of the diaphragm balances the force exerted on the water side of the diaphragm thereby to regulate the pressure of the water in the water chamber and within the watering pipe to a predetermined water pressure substantially less than the pressure of the water supply.

The regulator of the present invention can be switched between an operating mode in which the water pressure in the watering pipe is regulated to a predetermined low operating pressure, and a flushing mode in which water at full line pressure passes through the regulator and the watering system to flush out the regulator and watering system. The regulator is switched between the two modes by altering the positions of the inlet port and the valve member relative to each other. Preferably, the water inlet port is movable relative to the regulator housing between an operating mode in which the valve member is cooperable with the inlet port so as to open and block the inlet port and a flushing mode in which the valve member is clear of the inlet port. In a preferred embodiment, the water inlet is a tube movable relative to the housing between its operating and flushing modes by means of a lever and cover arrangement. The tube can also be moved axially via rotation of the tube in which the tube and a sleeve on the housing in which the tube is received include a pin and spiral groove or track. Rotation of the tube will cause the pin to move along the track (or vice versa) and cause the tube to move axially relative to the housing to a position in which it may not be sealingly engaged by the valve member.

The diaphragm of the regulator is supported to prevent the diaphragm from extending into the lower or ambient chamber of the regulator. Hence, the diaphragm cannot be flexed to a concave shape (relative to the water chamber). The regulator includes a stop in the ambient chamber which prevents the diaphragm from extending into the ambient chamber. Importantly, the support supports the diaphragm when the regulator is in its flushing mode and when full line pressure is exerted on the diaphragm. This prevents undue stretching of the diaphragm. To accomplish this, the regulator includes a rigid plate in the ambient chamber and which is movable with the diaphragm in the housing chamber. The plate engages the stop to prevent concave flexing of the diaphragm. Preferably, the stop is defined by a sleeve or tube in the ambient chamber.

A novel mounting bracket is also provided to suspend the regulator and a support pipe (i.e., a support member) in the poultry house. The mounting bracket includes a base operatively connected to the pressure regulator housing and a pair of arms extending from the base which are sized and shaped to define a passage through which the support pipe can pass. A finger extends from each the arm. The fingers are adjacent each other and connectable together to hold the first and second arms in position relative to each other. The fingers are connectable to a cable depending from a support structure (e.g., the roof trusses) in the building. The bracket independently suspends the support pipe and the regulator from the cable. The support pipe is gripped by the bracket arms, and the regulator is held by the bracket base. Hence, the regulator can removed from water system without affecting the support pipe.

BRIEF DESCRIPTION OF THE SEVERAL VIEWS OF THE DRAWINGS

FIG. 1 is a diagrammatic view of a poultry house having a watering system including a pressure regulator of the present invention supplying low pressure water to an elongate watering pipe having a series of drinking stations or drinkers spaced therealong;

FIG. 2 is an elevational view of a pressure regulator of the present invention carried by from a supporting pipe by a bracket of the present invention, with the regulator connected to two watering pipes for supplying low pressure water thereto;

FIG. 20 is a cross-sectional view of the pressure regulator in a flush mode with the water inlet tube in its flush position in which the full line pressure is applied to water chamber within the regulator and to the watering pipe(s).

Corresponding reference numerals will be used throughout the several figures of the drawings.

DETAILED DESCRIPTION OF THE INVENTION

Figure 3:
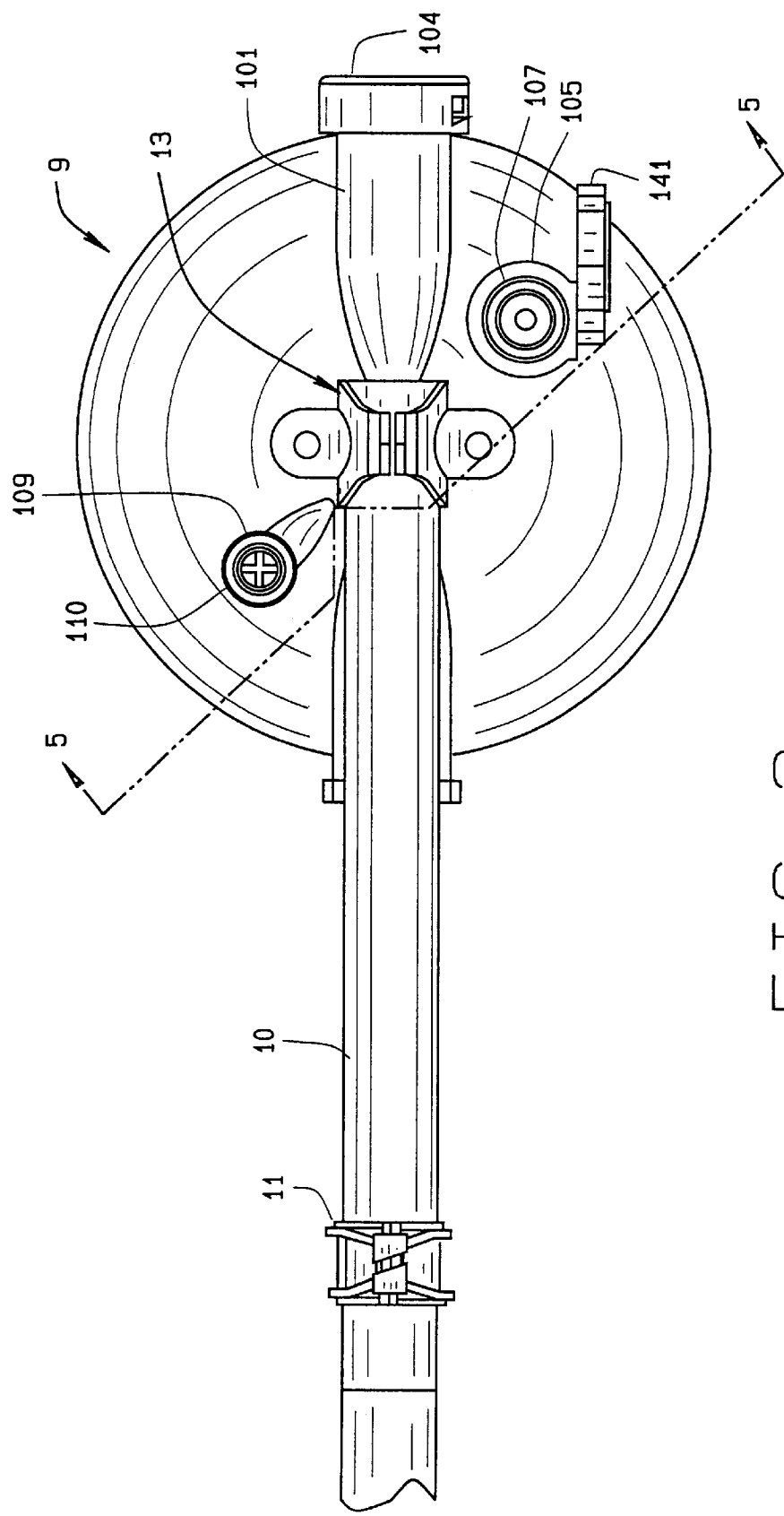
FIG. 3 is a top plan view of the pressure regulator of the present invention positioned at an end of the watering system.

The following detailed description illustrates the invention by way of example and not by way of limitation. This description will clearly enable one skilled in the art to make and use the invention, and describes several embodiments, adaptations, variations, alternatives and uses of the invention, including what is presently believed to be the best mode of carrying out the invention.

A watering system 1 for use in a poultry house H is shown schematically in FIG. 1. The watering system 1 includes a water supply pipe 3 which is connected to watering pipes 5, two of which are shown. A plurality of watering stations or drinkers 7 is spaced along each watering pipe 5. As is known, watering stations in poultry houses include valves, such as disclosed in U.S. Pat. Nos. 5,522,346 and 5,074,250 (which are incorporated herein by reference) which are activated by birds pecking against a pin. Hence, the pressure within the water pipes 5 is critical, and must be maintained at a low pressure (i.e., less than 6"–12" of water) which is substantially less than the line pressure (e.g., 30–60 psi). Thus, water regulators 9 are positioned in the water pipes 5 before the watering stations 7. The regulators 9 can be placed at the beginning of the water pipes 5, as schematically shown in FIG. 1, or intermediate the water pipes 5, as shown in FIG. 2. A support or stiffening member 10 (e.g., a support pipe) is suspended from the roof rafters of the poultry house H. The regulator 9 and water pipes 5 are carried by the support pipe. Hangers 11 and brackets 13 suspend the water pipe 5 and regulator 9 from the support pipe 10. Hangers 11 clampingly grip both support pipe 10 and watering pipe 5 at spaced locations therealong and thus transfer shear loads therebetween thus substantially stiffening the watering system.

Cables 15 (see FIG. 2) attached to the brackets 11 and 13 suspend the support pipe 11 from the roof trusses or the like of house H. Typically, cables 15 are part of a motorized winch and cable assembly that when selectively operated allows the drinking system to be raised and lowered. The cables are spaced at desired intervals (e.g., 5–15 feet) so as to suspend the support pipe 10 and regulator 9 in the poultry house H without undue deflection of either the support pipe 10 or the watering pipe 5. As will be understood by those skilled in the art, the cables are adjustable in the conventional manner so that the watering pipe 5 is substantially level along its length. It will be understood that the term cable refers generically to any member that may be used to suspend the water system from the roof structure of a poultry house. Such tension suspension members could include wire cables, chains, ropes, wires, rods, links or the like.

Figure 4:
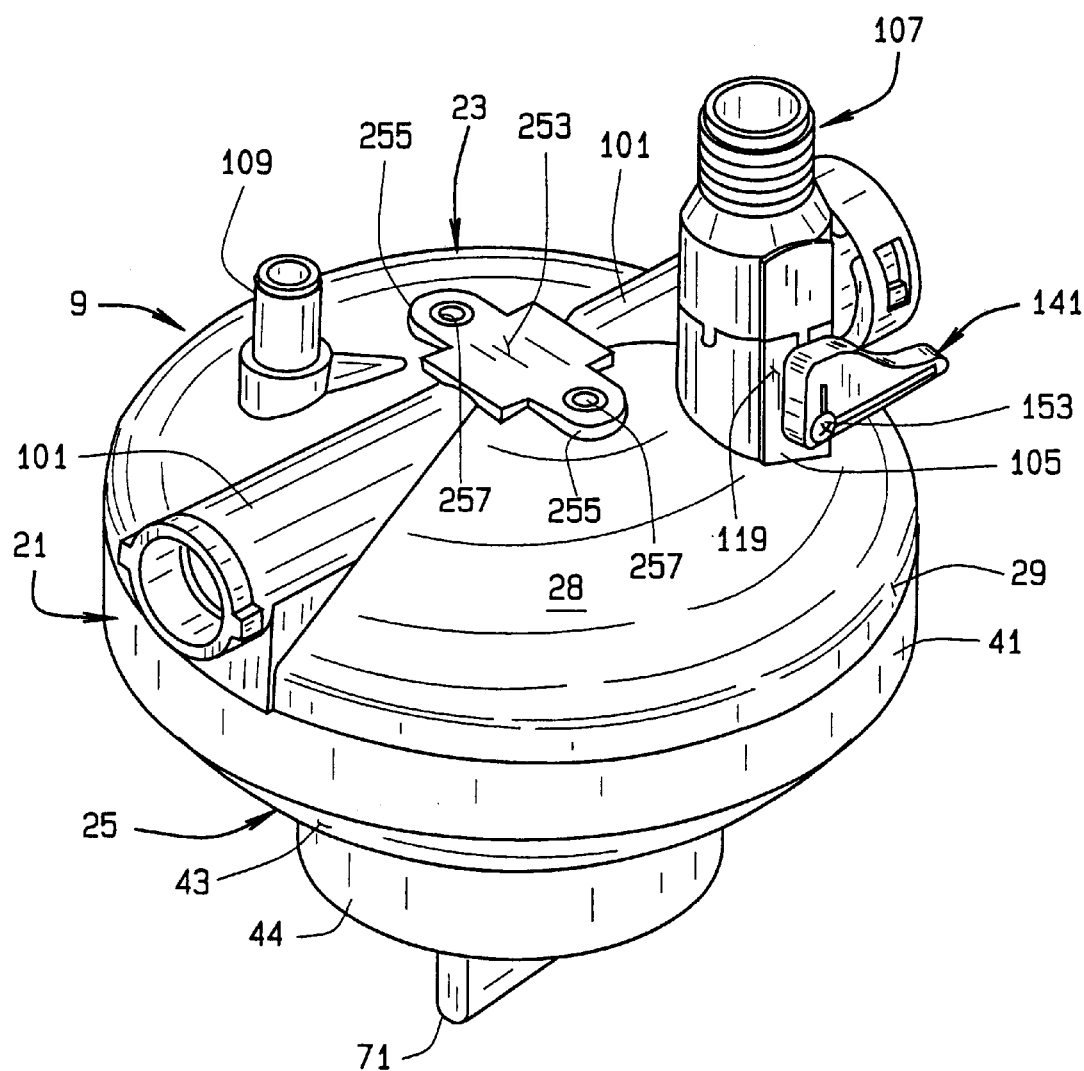
FIG. 4 is a perspective view of the pressure regulator.
Figure 5:
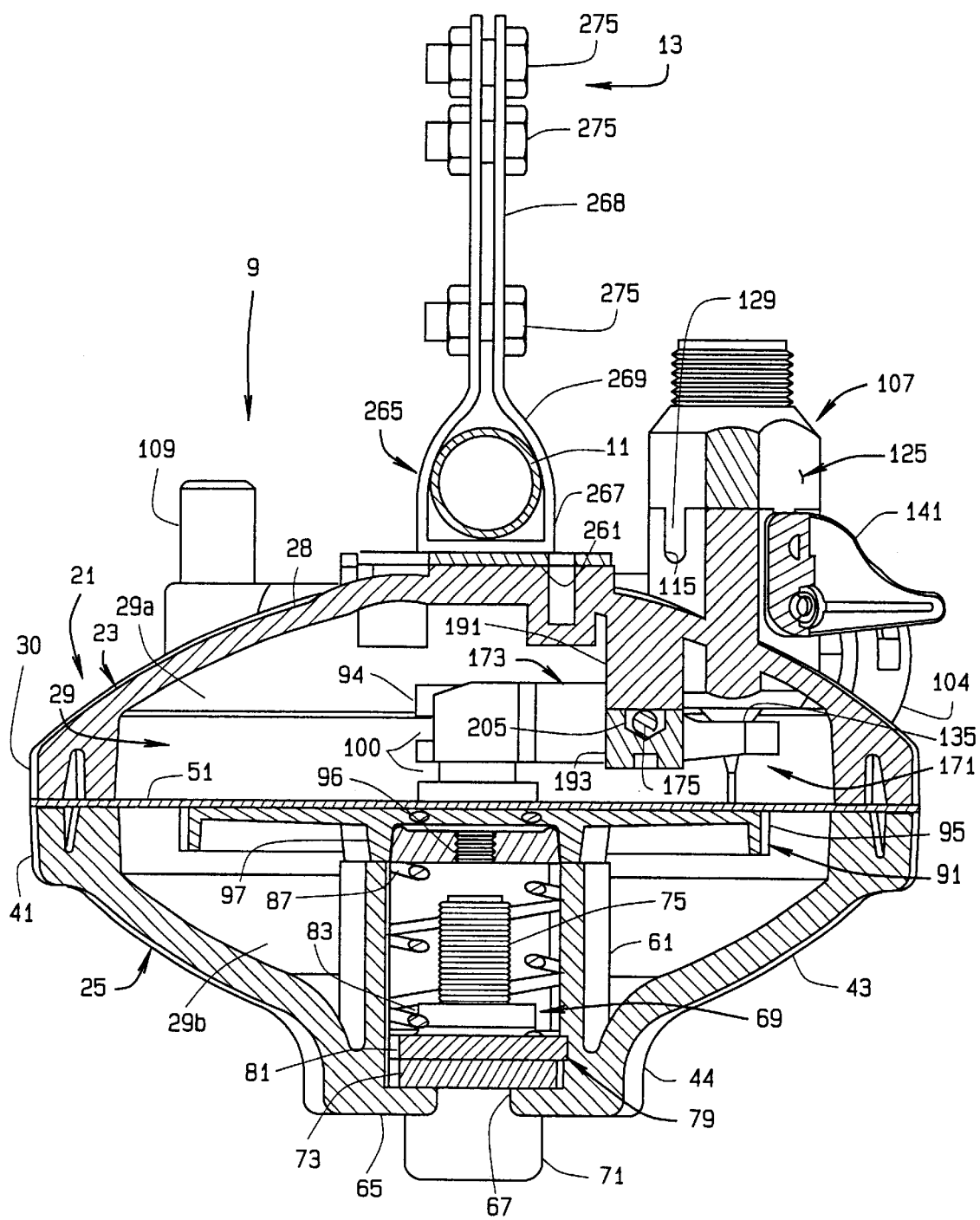
FIG. 5 is a cross-sectional view of the pressure regulator taken along line 5—5 of FIG. 3 illustrating a flexible diaphragm dividing the interior of the regulator housing into a water chamber and an ambient chamber and a valve member which opens and closes an inlet tube of the regulator.
Figure 6:
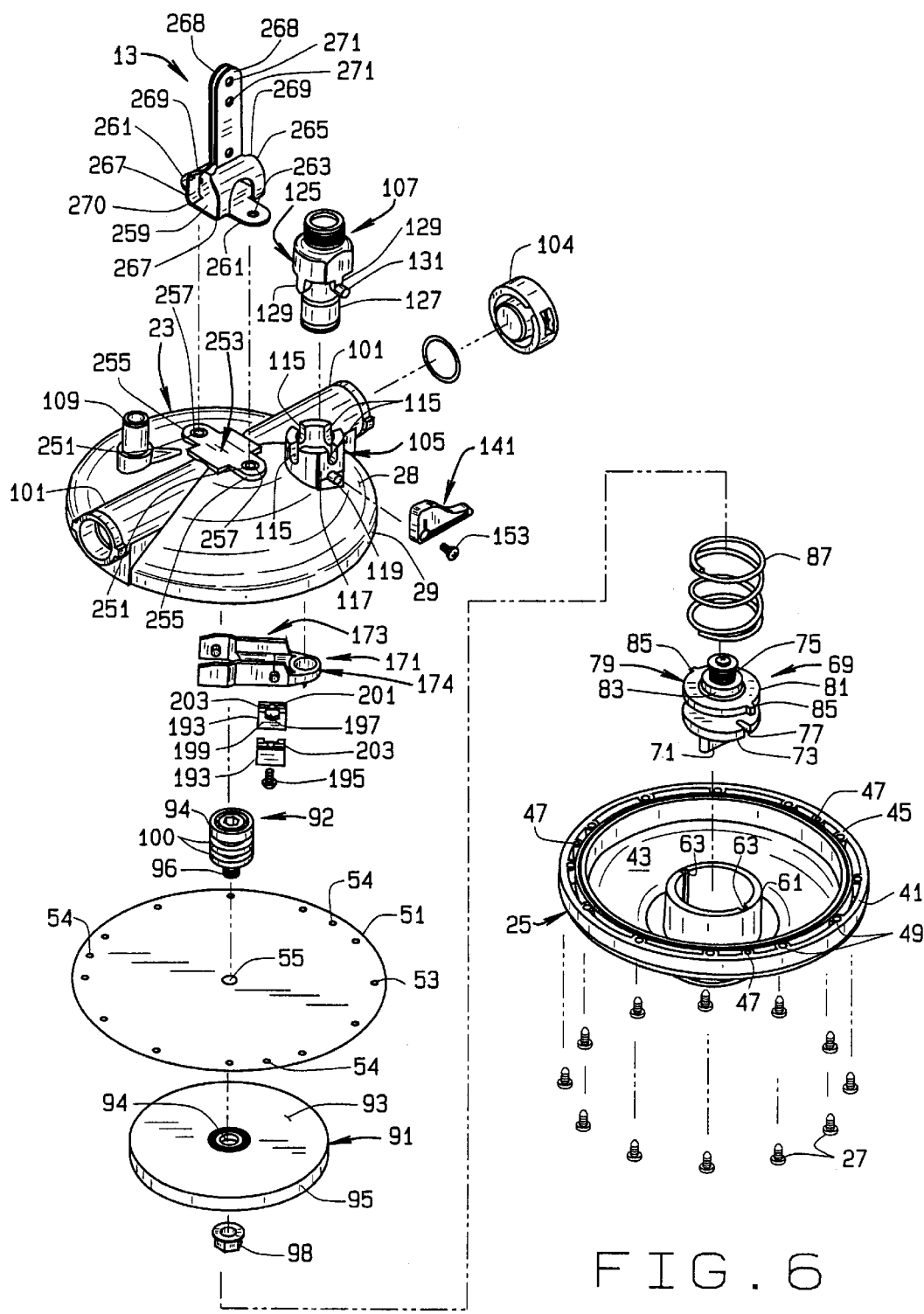
FIG. 6 is an exploded perspective view of the regulator.
Figure 8:
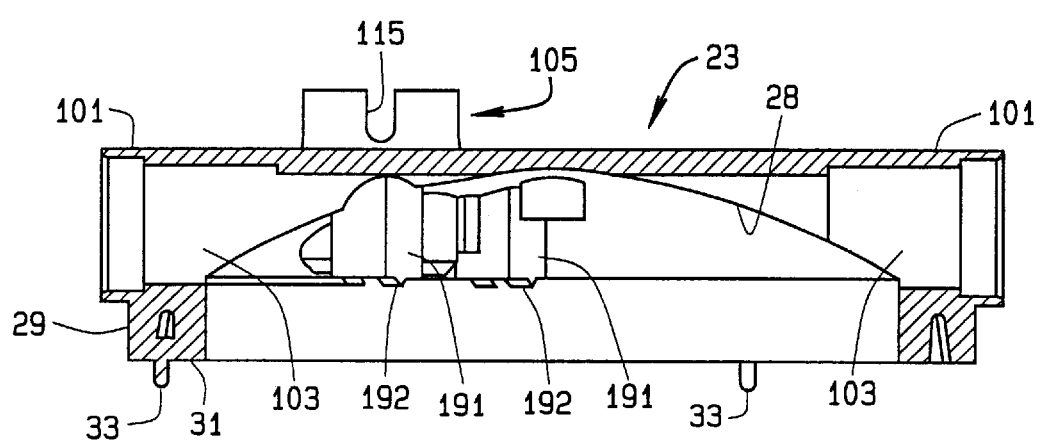
FIG. 8 is a cross-sectional view of the regulator top taken along line 8—8 of FIG. 7.

The regulator 9 is shown generally in FIGS. 2–6. The regulator 9 includes a housing 21 having a top cover 23 and a bottom 25 which are sealably connected together by a plurality of spaced fasteners, such as screws 27 (FIG. 6). The regulator housing defines a chamber 29 when the cover and bottom are sealably assembled. The cover 23 includes a domed upper wall 28 and a circumferential side wall 30. The side wall 30 has a lower surface 31 (FIG. 8) and locating pins 33 (three are shown) extend from the lower surface. Additionally, a plurality of screw holes 37 extend into the lower surface 31 to receive the screws 27. The regulator bottom 25 includes a circumferential side wall 41 and a generally bowled bottom wall 43 having a cylindrical base 44. The side wall 41 includes an upper surface 45 (FIG. 6) having locating pin receiving holes 47 and screw holes 49. As can be appreciated, when the cover 23 and bottom 25 are assembled together, the locating pins 33 are received in the bottom pin holes 47 to facilitate aligning the screw holes 37 and 49 of the cover 23 and bottom 25, respectively.

A flexible diaphragm 51 extends across the chamber 29 and divides the chamber into an upper water chamber 29a and a lower ambient chamber 29b. The diaphragm 51 has a diameter approximately equal to the outer diameter of the side walls 29 and 41 of the regulator cover 23 and bottom 25, respectively. The diaphragm 51 has a plurality of peripheral holes 53 and 54 through which the fasteners 27 and cover pins 33, respectively, pass when the regulator is assembled. With the cover 23 and bottom 25 held together by screws 27, the diaphragm 51 forms a seal with the regulator housing to prevent communication between the water chamber 29a and the lower, ambient, chamber 29b. Additionally, the diaphragm 51 has a central opening 55 (FIG. 6) for purposes as will appear.

The regulator bottom 25 includes a cylindrical sleeve 61 extending upwardly from the base 44. As seen in FIG. 6, the sleeve 61 includes a pair of oppositely disposed axially extending grooves 63. The regulator base 44 includes a bottom 65 and an opening 67 in the bottom 65. The base opening 67 is preferably concentric with the sleeve 61.

An adjuster assembly 69 is received in the sleeve 61. The adjuster assembly 69 includes rotary a knob 71 having a plate 73 sized to sit on the regulator base bottom 65 to close the opening 67. Knob 71 extends through the opening 67 and is accessible externally of the regulator. A threaded post 75 extends upwardly from the plate 73. The plate 73 also includes a notch 77 which extends radially inwardly from the edge of the plate. An internal adjuster 79 is received on the threaded post 75. The internal adjuster 79 includes a collar 81 and a post 83 extending upwardly from the collar. The threaded bore 85 extends through the collar 81 and post 83, and is sized to be threadably received on the threaded post 75 of the knob 71. The internal adjuster 79 also includes tabs 86 which are positioned and sized to be received in the grooves 63 of the regulator bottom sleeve 61. As can be appreciated, with the internal adjuster 79 threaded on knob 71 and rotationally fixed with respect to the sleeve 61, as the knob 71 is rotated, the internal adjuster 79 will move axially relative to the knob post 75. A washer 88, having an outer diameter greater than the knob post 75, is secured to the top of the post 75 to prevent the internal adjuster 79 from coming off post 75. A spring 87, such as coil spring, is sandwiched between the internal adjuster 79 and the diaphragm 51. As the knob 71 of the adjuster assembly is rotated, the internal adjuster 79 moves axially, changing the amount of compression of the spring 87. Hence, the pressure needed to deflect the diaphragm 51 is altered. While a coil spring 87 is preferred to resiliently bias diaphragm 51, those skilled in the art will recognize that other biasing means such as an air spring, a stack of spring washers, a hairpin spring, or the like may be used.

As shown in FIG. 5, a diaphragm support plate or paddle 91 rests on the upper end of the regulator bottom sleeve 61. The spring 87 of the adjuster assembly 69 engages the bottom surface of the paddle 91. The upper surface 93 of support plate 91 is in contact with diaphragm 51 to maintain the diaphragm flat and to limit stretching of the diaphragm during operation of the regulator. In this manner, only an outer annulus of diaphragm between the outer edge of plate 91 and the inner surface of the regulator housing 25 is unsupported. This is particularly advantageous during the flush mode of the regulator when the full line pressure acts on the diaphragm so as to prevent stretching and overloading of the diaphragm.

Figure 18:
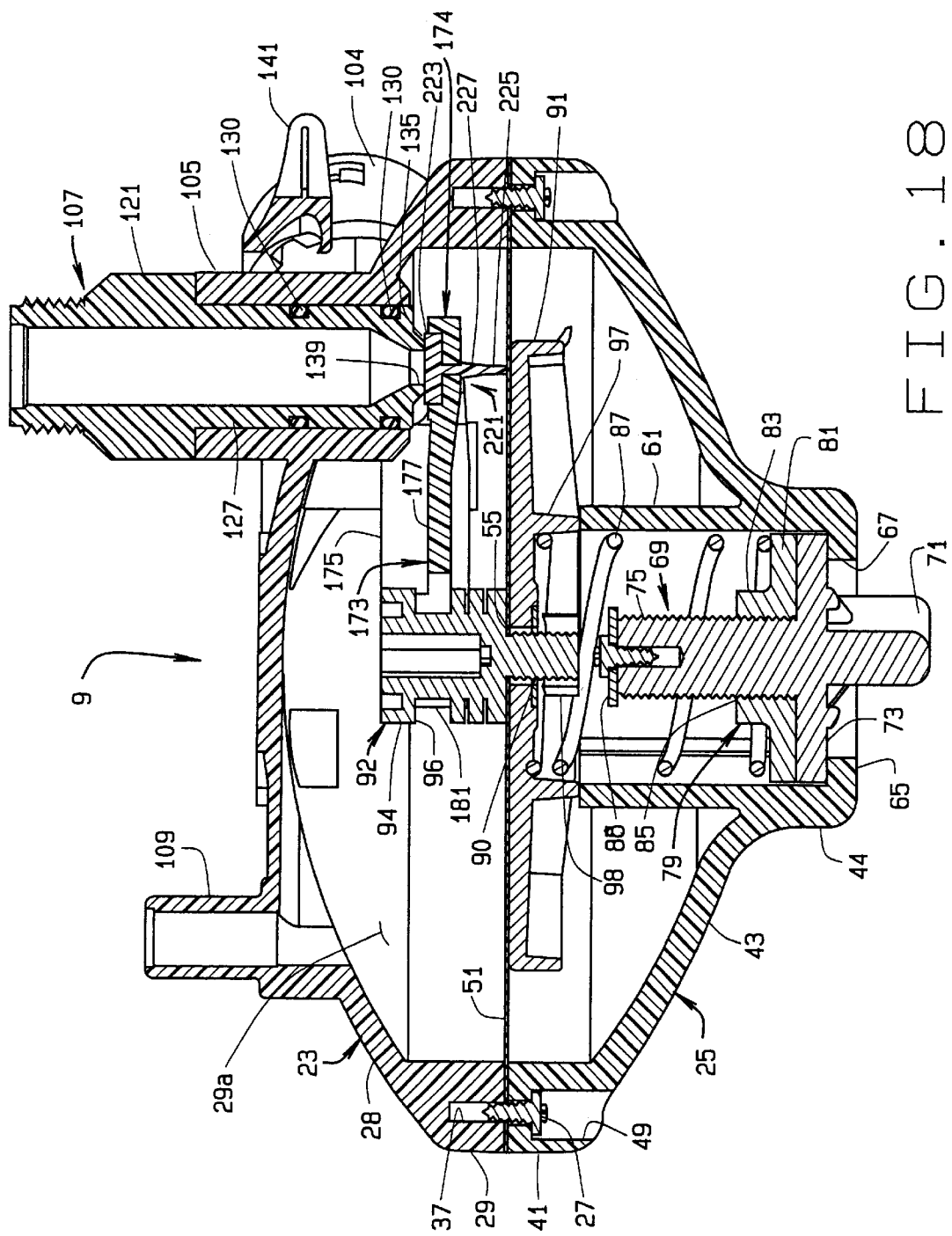
FIGS. 18 and 19 are cross-sectional views of the pressure regulator with the water inlet tube in its operative position in both views in its operational mode with the valve assembly in its closed and opened positions, respectively, so that the regulator will supply the water to the watering pipes at a predetermined low pressure.

A hole 94 is formed in the center of the support plate 91 and passes from the top surface 93 through to the bottom surface. The support plate 91 has a side wall 95 and ribs 97 which rigidize the support plate 91. As seen in FIGS. 5 and 18, the support plate 91 rests on (is bottomed out) the regulator bottom sleeve 61 and is generally level or co-planar with the junction between the regulator cover 21 and bottom 25 when the diaphragm 51 is in a generally flat or planar position. As can be appreciated, the positioning of the support plate 91 substantially prevents the diaphragm from being flexed into the regulator bottom 25, or being over stretched to a concave shape. Although the support plate 91 is shown with the ribs contacting the upper surface of the sleeve 61, the sleeve 61 could be extended, or a cylindrical wall could depend from the bottom of the support plate so that the support plate is co-planar with the junction of the regulator cover and bottom when the diaphragm is relaxed.

A diaphragm shaft or mount 92 extends up from the center of the diaphragm 51 into the water chamber 29a. The diaphragm mount 92 includes a body 94 and threaded shaft 96. The shaft 96 extends through the central opening 55 of the diaphragm and the central opening 94 of the support plate 91. Of course, shaft 96 is sealed with respect to the diaphragm. A nut 98 is threaded on to the end of the shaft 96 to secure the mount 92, the diaphragm 51, and the paddle 91 together as an assembly. Although a nut is used to secure the mount 92 to the paddle 91, other conventional means could be used as well. For example, the hole 94 could, itself, be threaded. Alternatively, a bayonet-type lock could be used. The mount body 94 includes a pair of circumferential grooves 100 axially spaced apart on the body 94.

The regulator cover 23, as noted above, includes a side wall 30 and an upper domed surface 28. Outlet tubes 101 extend from opposite sides of the regulator cover and are connectable to the water pipes 5. The outlet tubes 101 have ports 103 therein so that water pipes 5 are in communication with the water chamber 29a of the regulator. If the regulator 9 is to be positioned at an end of a water line, one of the outlet tubes 101 can be closed with a cap 104.

The regulator cover 23 also includes a water inlet sleeve 105 which receives a water inlet tube, as generally indicated at 107. The cover 23 also has a fitting 109 for connection to a stand pipe 110 (see FIG. 3). Both the sleeve 105 and the stand pipe fitting 109 open into and are in communication with the water chamber 29a via ports 113 and 111, respectively. The standpipe fitting 109 is hollow and places the chamber 29a in communication with the atmosphere via elongate standpipe 110. The inlet sleeve 105 includes slots 115 extending downwardly from the upper edge of the sleeve. Four slots 115 are shown, and are evenly spaced about the sleeve 105. The sleeve 105 also includes a flat vertical face 117 from which a pin 119 extends.

The water inlet tube 107 is shown in more detail in FIGS. 11–15. The water inlet tube 107 is slidably and sealably received in water inlet sleeve 5 for purposes as will appear. The water inlet tube includes a body 121 having a curved outer surface 123 which extends about 290° around the body and a flat surface 125. A threaded end 126 extends upwardly from the body to sealably connect the water inlet tube 107 to the supply pipe 3. A stem 127 extends downwardly from the body 121. The lower portion of the stem 127 is narrower in diameter than the body 121, and hence, the stem 127 and body 121 define a shoulder or body bottom surface 128. The body 121 has an outer diameter approximately equal to the outer diameter of the inlet sleeve 105, and the stem 127 has an outer diameter slightly less than the inner diameter of the inlet sleeve 105. Hence, the stem 127 can moved axially relative to the inlet sleeve 105 between an operative position and a flush position. When in its operative position (as shown in FIGS. 4, 5, 18 and 19), surface 128 rests on the upper surface of the inlet sleeve 105 to limit the extent to which the stem 127 can extend into the sleeve 105.

Figure 13:
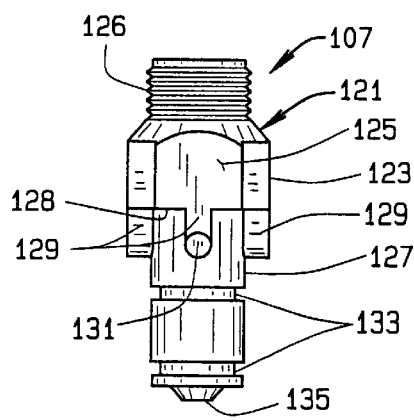
FIG. 13 is a side elevational view of the water inlet tube.
Figure 14:
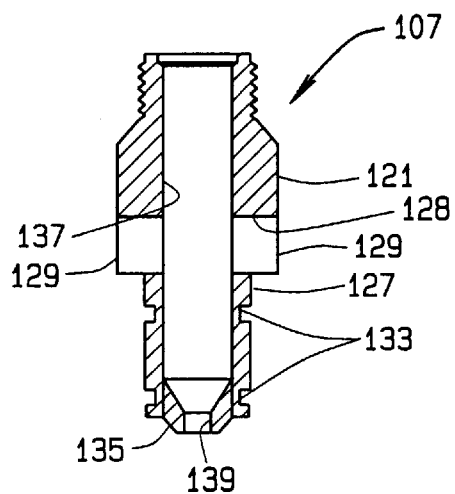
FIG. 14 is a cross-sectional view of the water inlet tube.
Figure 15:
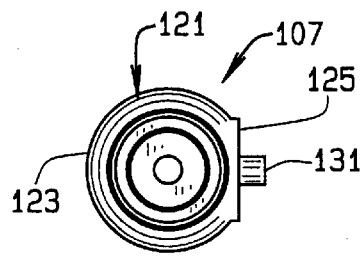
FIG. 15 is a top plan view of the water inlet tube.

When in its flushing position (see FIG. 19), the surface 128 is spaced from the upper surface of sleeve 105 and the bottom end of the tube 107 is at least partially withdrawn into sleeve 105. Fingers 129 extend axially down from the bottom 128 of body 121 a short distance axially along the stem 127. Fingers 129 are sized and positioned to be slidably received in the slots 115 of the inlet sleeve. A post or cam follower 131 extends outwardly from the base of one of the fingers 129. Preferably, the cam follower 131 is generally centered with respect to the flat surface 125, as seen in FIG. 13. A pair of spaced apart circumferential grooves 133 are positioned below the fingers 129 to receive O-rings 130 (FIG. 18) to form a liquid tight seal between the water inlet tube 107 and the inlet sleeve 105 and yet to permit sliding motion of tube 107 within tube 105. The stem 127 tapers at its bottom, as at 135, to form an inverted conical valve seat. Internally, the water inlet tube 107 includes a bore 137 which is substantially constant in diameter for a majority of the length of the member 107. However, at the base of the stem, the bore 137 tapers to an outlet port 139 that is about ⅓ the diameter of the bore centered with respect to valve seat 135. Preferably, in a water inlet tube having a bore of about 0.67", the outlet 139 is about 0.25". However, it will be appreciated that bore 137 may be of any configuration and need not be stepped, as shown.

Figure 16:
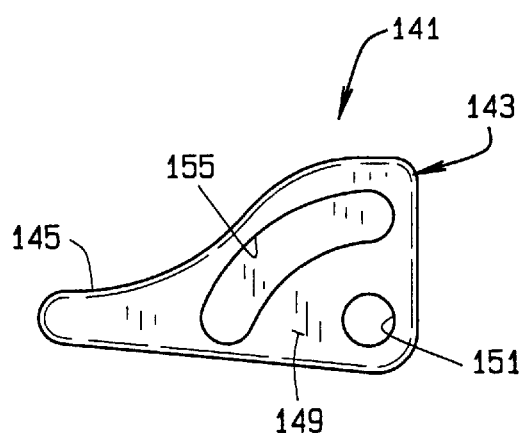
FIGS. 16 and 17 are back and front elevational views of a lever of the pressure regulator with FIG. 16 illustrating a cam slot for moving the water inlet tube between its operative and flush positions.
Figure 17:
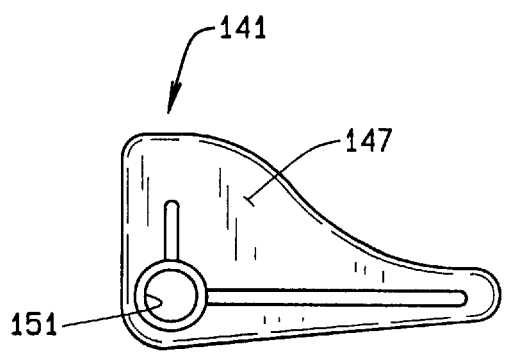

A flush lever 141 is pivotally connected to the inlet sleeve 105 and operatively connected to the water inlet tube 107 to move the water inlet tube axially relative to the sleeve between its operative and flush positions. The flush lever 141, which is shown in FIGS. 16 and 17, includes a body 143 having an arm 145 extending therefrom. Preferably, body 143 defines approximately ¼ of a circle, and arm 145 extends outwardly from a bottom edge of the body. The lever 141 has an outer face 147 and an inner face 149. A hole 151 extends through the lever 141 at a forward corner of the body 143. The hole 151 is sized to be received on the post 119 (see FIG. 6) of the regulator cover inlet sleeve 105. A fastener 153, such as a screw, as shown in FIG. 6, is used to secure the lever 141 to the post 119 to prevent the lever from coming off the post. As can be appreciated, the post 119 defines an shaft on which the lever 141 rotates. An arcuate slot or cam groove 155 is formed on the lever inner surface 149. The cam groove 155 receives cam follower 131 of the water inlet tube 107. Thus, as the lever 141 is rotated or pivoted about the inlet sleeve post 119, the interaction of the cam slot 155 with the water inlet tube cam follower 131 causes the water inlet tube 107 to move axially relative to the inlet sleeve 105 on the water regulator cover 23. As will be discussed below, rotary movement of the lever 141 moves the water inlet tube 107 relative to sleeve 105 between first or operative position (FIGS. 18 and 19) in which the regulator is in an operational mode to control the pressure of water passing from the regulator 9 into the water pipes 5 to a desired or predetermined low pressure condition (e.g., 4–12 inches of water pressure), and a second, or flush, position in which valve seat 135 is moved clear of the valve seal 221 such that the regulator is in a flush mode thus admitting the full line water pressure into water chamber 29a and water pipe 5 to flush sediment and debris therefrom.

A pressure regulator valve assembly 171 is mounted in the water chamber 29a and is movable between a first or closed position (FIG. 18) in which the valve assembly engages valve seat 135 of the water inlet tube 107 to close the water inlet tube exit port 139 to prevent water from flowing through the regulator, and a second or open position (FIG. 19) in which the valve assembly is clear of valve seat 137 so that water supply line 3 can pass through the regulator and into the watering pipes 5 through the ports 103 and tubes 101. As will be discussed below, the movement of the valve assembly between its open and closed positions is governed by the pressure of the water within water chamber 29a, acting on the diaphragm 51 and the force of spring 87, and the atmosphere acting on the other side of the diaphragm.

Figure 9:
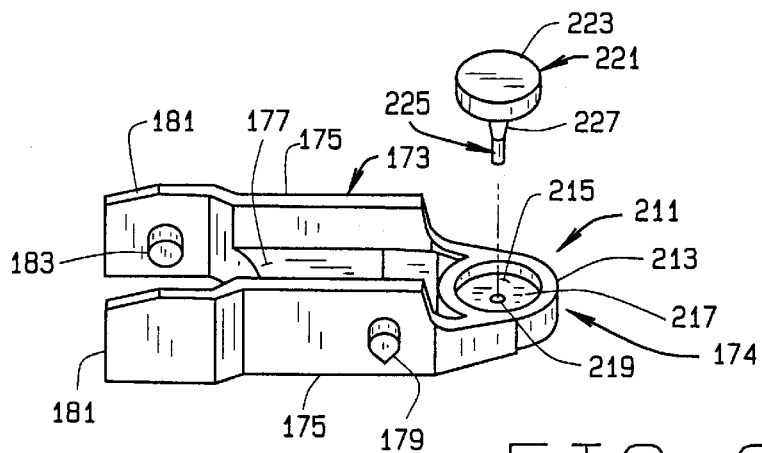
FIG. 9 is an exploded perspective view of the valve or internal plunger assembly of the pressure regulator.
Figure 10:
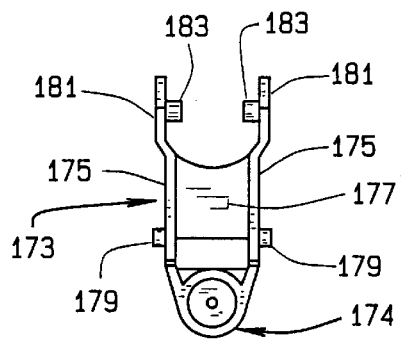
FIG. 10 is a top plan view of the valve.
Figure 11:
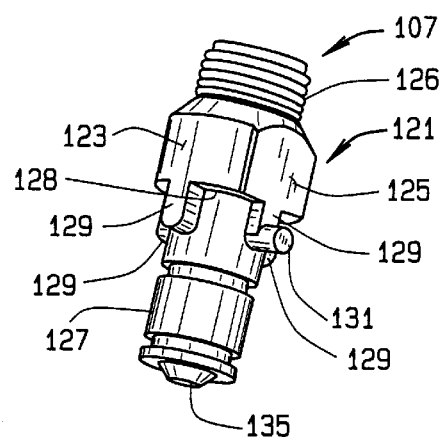
FIG. 11 is a perspective view of a water inlet tube of the pressure regulator.
Figure 12:
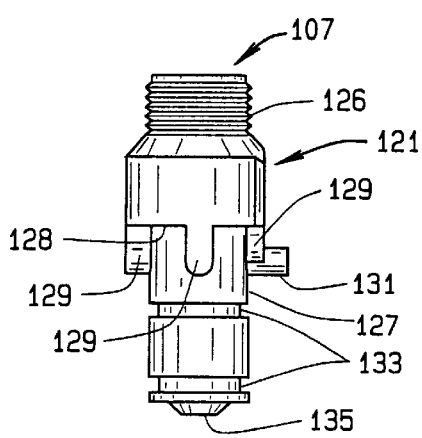
FIG. 12 is a front elevational view of the water inlet tube.

The valve assembly 171 includes a pivot arm 173 (shown in more detail in FIGS. 9 and 10) which is operationally connected at one end to mount 92 and near another end, is pivotally connected to the regulator cover 23. The pivot arm 173 have a valve member 174 on one end which when in its closed position blocks flow from valve seat 135 and which when in its open position is clear of the valve seat. The pivot arm includes a pair of side walls 175 spaced apart by a web 177. A pair of pivot posts 179 extend outwardly from the walls 175 near the forward end thereof. A pair of deformable snap arms 181 extend from the back end of the side walls 175. Each snap arm 181 includes an inwardly directed finger 183. As seen in FIG. 10, the back edge of the web 177 is radiused, and defines a radius complimentary to the radius of the mount 92. The snap arms 181 are spaced apart a distance slightly greater than the diameter of the mount body 94; the fingers 183 have a length slightly greater than the radial width of the grooves 100 of the mount body 94; and the fingers 183 are spaced rearwardly from the back edge of the web 177 a distance slightly greater than the diameter of the mount body 94. As the snap arms 181 are passed around the mount body 94, the snap arm fingers 183 engage the mount body 94 within the groove 100, and are urged apart. Once the snap arms 181 pass approximately half-way through the diameter of the body 94, the fingers 183 snap into place behind the body 94 and within the groove 100 to pivotally secure the pivot body to the mount 92.

Figure 7:
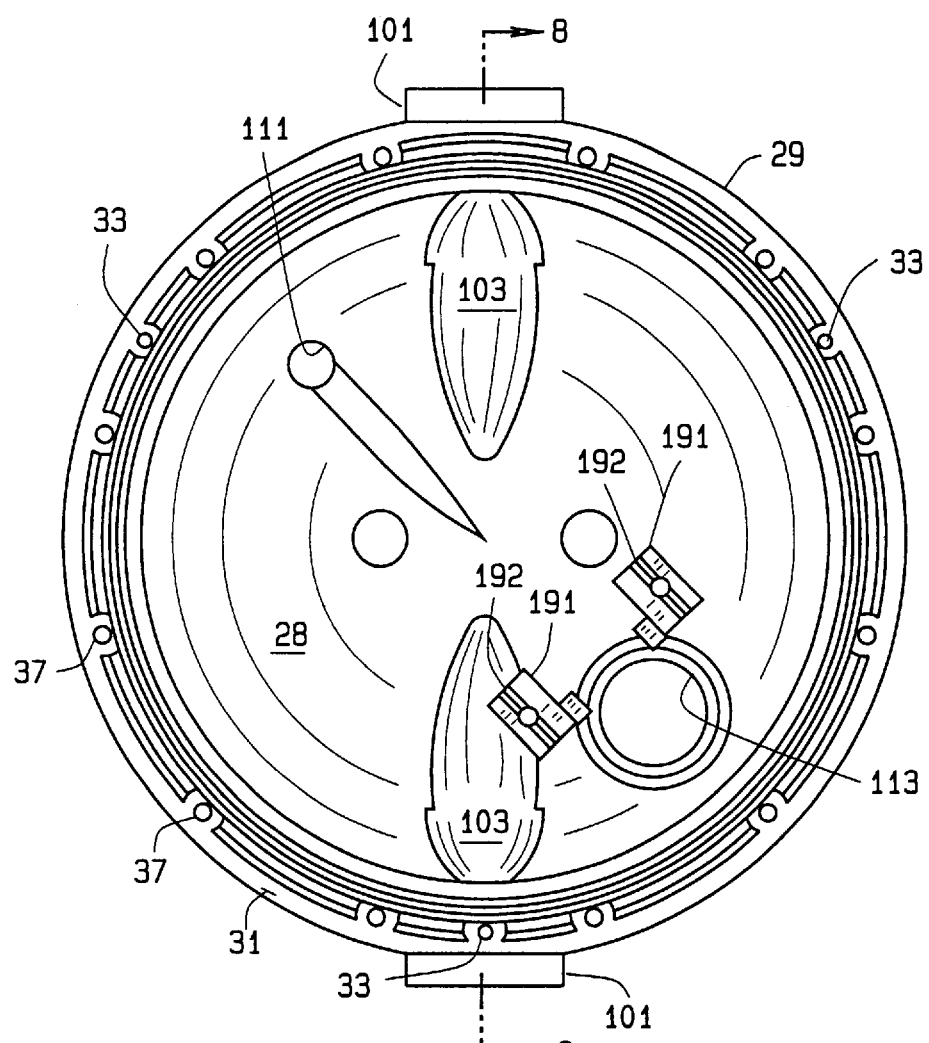
FIG. 7 is a bottom plan view of the regulator top.

The regulator cover 23 includes mounting blocks 191 (FIG. 7) near the port 113 of the inlet sleeve 107. The mounting blocks 191 are preferably molded as part of the cover 23. The blocks 191 preferably include a rib 192 (FIG. 8) in the bottom surface of the blocks. A second set of blocks 193 (FIG. 5) are secured to the mounting blocks 191 using, for example, screws 195 (FIG. 6). The second blocks 193 each include a groove or slot 197 formed in the inner surface 199 of the blocks and extending downwardly from the top surface 201 of the blocks 193. The blocks 193 also include a groove 203 in their top surfaces 201. The grooves 203 of the blocks 193 receive the ribs 192 of the blocks 191 to facilitate locating the blocks 191 and 193 together. When assembled together, the two blocks 191 and 193 define a pocket 205 (FIG. 5) sized to receive the pivot posts 175 of the pivot member 173. As can be appreciated, during assembly, the pivot member pivot posts 175 are placed in the grooves 197 of the blocks 193, and then the blocks 193 are fastened to the blocks 191 thus pivotally mounting valve assembly on the underside of housing cover 23.

Valve 174 includes a circular formation 211 formed at the forward end of the pivot arm 173 and extends from the forward end of the side walls 175 and web 177. The circular formation 211 includes a circular wall 213 and a floor 215 defining a chamber 217. A hole 219 extends through the floor 215 in the approximate center of the floor.

A seal 221 is received in the circular formation 211. The seal 221 has a head 223 sized to be received in the chamber 217 of the circular formation 211. A stem 225 extends downwardly from the bottom of the head 223 and includes an inverted conical section 227 spaced below the head 223. The distance between the top of the conical section 227 and the bottom surface of the head 223 is slightly greater than the thickness of the floor 215 of the circular formation 211. Hence, when the stem 225 is passed through the hole 219 in the floor 215, the conical section 227 of the stem will prevent the seal 221 from coming off the pivot member circular formation 211; and, due to the distance between the stem conical section 227 and the seal head 223, axial movement of the seal 221 relative to the pivot member 173 is substantially prevented.

Figure 19:
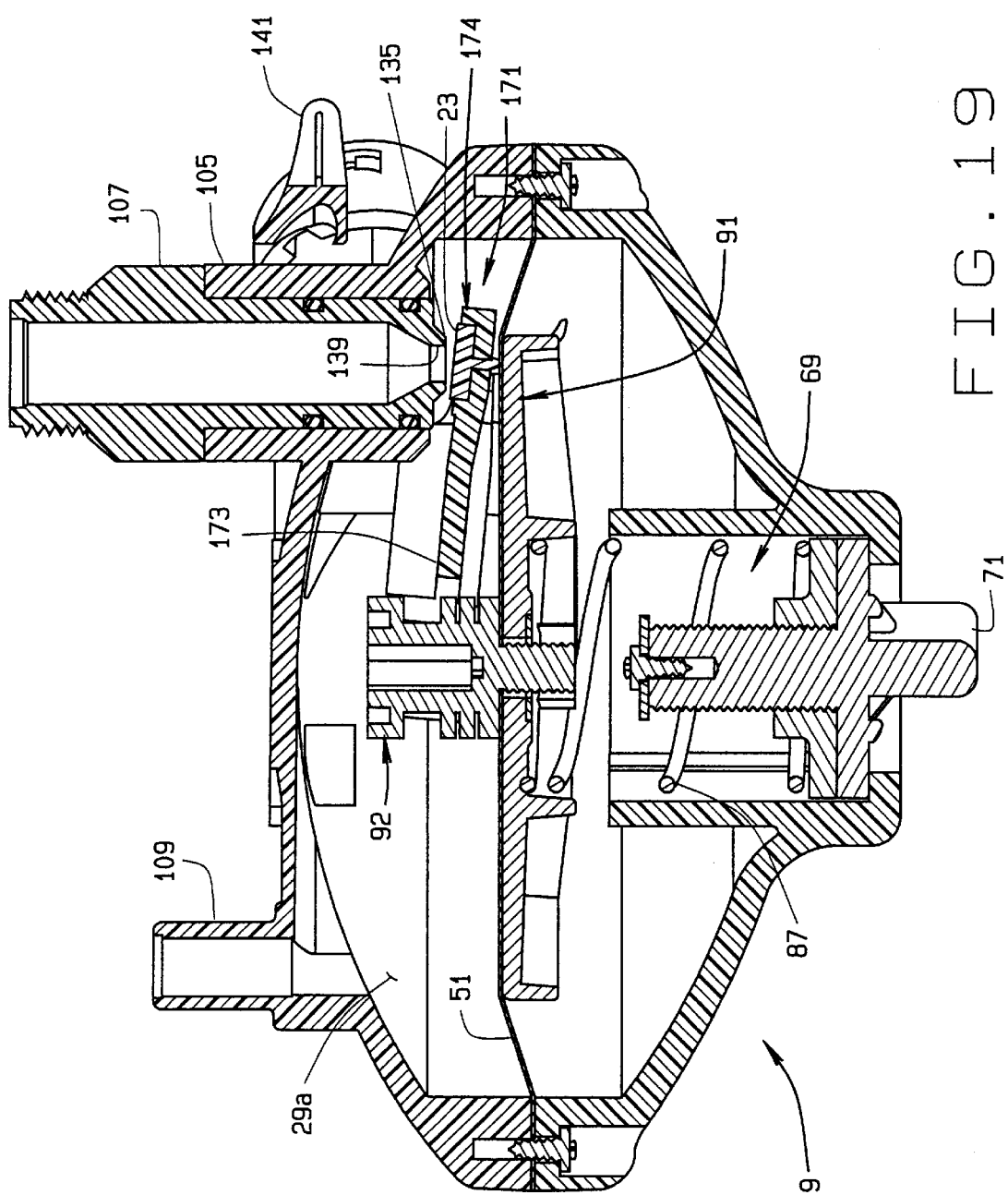

Turning to FIGS. 18 and 19, when lever 141 is in its lowered position, the water inlet tube 107 and thus regulator 9 are in their operational mode (i.e., to control the pressure of the water passing through the regulator and to the water pipes 5). As can be appreciated, the spring 87 in the bottom, ambient, chamber 29b and atmospheric pressure acting on the bottom face of diaphragm pushes upwardly urging the mount 92 upwardly, as seen in FIG. 19. The upward movement of the mount 92 causes the valve 173 to pivot about its pivot posts 175 and to move the valve 174 downwardly, away from valve seat 135 of the water inlet tube 107 to open the water inlet tube, and to allow water to pass from the supply line 3 through the inlet tube 107, into the regulator water chamber 29a, through the ports 103 and tubes 101, and into the water pipes 5, to provide water to the drinking stations 7. As the pressure increases in water chamber 29a, diaphragm 51 moves downwardly causing valve 171 to rock on posts 179 so that valve 174 moves upwardly to engage and close outlet port 139 in valve seat 135 of water inlet tube 107. The force of spring 87 and of the atmosphere acting on the bottom face of diaphragm 51 is countered by the pressure in the watering system, and, in particular, the pressure in the water pipes 5 (which are in communication with the regulator chamber 29a). Hence, when the water pressure in the pipes 5 (and in the regulator chamber 29a) falls below a predetermined level (as determined by the pre-load placed on spring 87 by knob 71), the spring forces the diaphragm to move upwardly to open the water inlet, as seen in FIG. 19. In this manner, a predetermined pressure level is maintained in chamber 29a and in water pipe 5 which is greatly reduced from the pressure in water supply line 3.

As can be appreciated, support plate 91 supports the bottom face of diaphragm 51 so as to prevent the diaphragm from extending below the plane of the junction between the regulator cover 23 and bottom 25. As will be appreciated, when regulator 9 is in its flushing mode with the fuel line pressure acting on the diaphragm, support plate 91 transfers the majority of the force to sleeve 61 thus lessening stretching of the diaphragm.

Turning to FIG. 20, when the lever 141 is raised, arcuate cam groove 155 and cam follower 131 move water inlet tube 107 upwardly relative to the regulator inlet sleeve 105. In this position, the inlet tube valve seat 135 and its port 139 are moved upwardly a distance greater than the distance moved by pivot valve 173. Hence, valve seal 221 cannot contact and seal the water inlet tube port 139. Therefore, when the water inlet tube 107 is raised up to its flush positions, full line water pressure passes through the regulator 9, the water pipes 5, and the watering stations 7, to flush out the system. By rotating lever 141 in the opposite direction, the water inlet tube is returned to its operative position in which valve seat 135 is in position to be engaged by valve seal 221 of pivot valve 173. As can be appreciated, by moving the water inlet tube 107 to switch the regulator between operating and flushing modes, there is only a single port into the regulator—that is, there is not a separate port for flushing and a separate port for operating the watering system. Such two port by-pass systems increase the number of seals required in the regulator, and make construction of the regulator more costly. Again, by using only a single inlet port, and moving the inlet port, the number of seals required by the regulator is reduced.

Turning to FIGS. 4–6, the watering system of the present invention utilizes a novel method of coupling regulator 9 to support pipe 11 which allows for the regulator 9 to be removed from the watering system without affecting the support pipe 11. Specifically, a mounting bracket 13 is secured to the top of the regulator cover 23. The regulator cover 23 includes a platform 253 generally in the center. The platform 253 is generally square in shape with a pair of wings 255 having threaded holes 257 formed therein.

As best shown in FIG. 6, mounting bracket 13 includes a base 259 having ears 261 extending therefrom. The ears 261 include holes 263 and are positioned such that the ear holes 263 align with the screw holes 257 on the regulator platform 253. Screws or bolts pass (not shown) through the holes 263 in the bracket ears 261 and into the holes 257 in the platform wings 255 to removably secure the regulator 9 to the bracket 251.

Spaced apart wall members 265 extend from the bracket base 259. The wall members 265 include a generally vertical section 267, having a height greater than the diameter (or height) of the support pipe 11, and an inwardly directed upper section 269. The inwardly directed section 269 of the walls 265 meet approximately over the center of the base 259, and arms 268 extend upwardly from the center of the top portion 267. The wall members 265, in conjunction with the base 259, form a channel or passage 270 through which the support pipe 11 can pass. The arms 268 include openings 271. Support cables 15 may be attached to the uppermost opening 271 to hang the bracket 13 from the roof of the poultry house H. Bolts 275 and nuts are installed in the lower opening 271 forcibly draw arms 268 together. As the lower bolt 275 is tightened, the upper sections 269 are drawn inwardly and downwardly on support pipe 11 thereby to forcibly grip the support pipe. As can be appreciated, the support pipe 11 and the regulator 9 are independently connected to the bracket 13. The support pipe 11 is supported in the bracket 13 via the bracket channel 270, and the regulator 9 is removably connect to the bracket ears 261 by fasteners (such as bolts, screws, or the like). Hence, should the regulator need to be removed from the watering system, support of the support pipe 11 will not be interrupted.

The bracket 13 is preferably a one-piece member stamped from sheet metal and bent into the shape seen in FIG. 6. However, within the broader concept of this invention, bracket 13 may be fabricated from multiple pieces and welded, or bracket 13 could be molded of a suitable plastic. Holes are formed in the wall vertical sections 265 which correspond to the ears 261.

As various changes could be made in the above constructions without departing from the scope of the invention, it is intended that all matter contained in the above description or shown in the accompanying drawings shall be interpreted as illustrative and not in a limiting sense. For example although the inlet tube 107 is shown to be axially movable by the cam action of the lever 141, the inlet tube 107 could also be axially raised and lowered by threadably mounting the tube 107 in fitting 105 by means of advanced pitch threads on grooves and by rotation of the tube. There are numerous other methods for axially moving the inlet tube 141 as well. For example, the tube can be moved via pneumatically, hydraulically, or electrically actuated pistons, or a gear system can be used. Additionally, the inlet tube could be movably mounted in the housing, so that the port is swung into and out of alignment with the valve member (as opposed to being moved into, and out of, reach of the valve member). Hence, the inlet tube would be pivoted, instead of moving axially. The housing could also be molded so that the tube could be moved across the surface of the housing, rather than generally perpendicularly, to move the inlet port into and out of alignment with the valve member. The regulator could also be configured to move the pivoting valve member 173 relative to the inlet tube, rather than moving the inlet tube relative to the valve member. The support tube 11 is shown to be circular. However, the support tube can be any other desired shape—for example, the tube 11 can be quadrilateral or triangular. The sleeve 61, as can be appreciated, acts as a stop for the support plate 91 to prevent the diaphragm from flexing into the ambient or lower chamber. Fingers extending in from the periphery of the housing bottom could be used instead of the sleeve 61 as a stop for the plate 91. Although the spring 87 is shown to be a coil spring, those skilled in the art will appreciate that the spring 87 could be replaced with an air spring, an hydraulic spring, a torsion spring, or any other type of spring, or resilient material which will bias the paddle 91 upwardly. These examples are merely illustrative.

What is claimed is:

1. In a pressure regulator for a poultry drinking system, said drinking system including an elongate watering pipe having a plurality of poultry drinking stations spaced therealong, said regulator comprising a housing having a chamber therewithin, a flexible diaphragm sealed with respect to said housing and dividing said chamber into a water chamber and an ambient chamber, and a spring carried by said housing in operable engagement with said diaphragm such that the force of said spring and of the atmosphere acts upon said diaphragm to force said diaphragm toward said water chamber; said housing having a water inlet adapted to be connected to a supply line and an outlet adapted to be connected to said watering pipe; said inlet and said outlet being in communication with said water chamber; said inlet having an inlet port; said regulator further having a valve carried by said housing and being operatively associated with said diaphragm for movement between a closed position in which said valve blocks the flow of water from said inlet port into said water chamber and an open position in which water is permitted to flow from said inlet port into said water chamber such that with said spring adjusted to a predetermined level the force of said spring acting on the lower side of said diaphragm balances the force exerted on the water side of said diaphragm thereby to regulate the pressure of the water in said water chamber and within said watering pipe to a predetermined water pressure substantially less than the pressure of said water supply, wherein the improvement comprises:

said inlet port being movable with respect to said housing between a regulating position in which said inlet port is engageable by said valve member so as to block the flow of water from said inlet port into said water chamber and a flushing position in which said inlet port is clear of said valve so as to permit water from said supply line to flow through said water chamber and into said watering pipe to flush said water chamber and said watering pipe.

2. The pressure regulator of claim 1 wherein said inlet port is sealably slidable relative to said housing so as to permit movement between its said regulating position and said flushing position.

3. The pressure regulator of claim 2 wherein said housing includes a sleeve for receiving said inlet port and for permitting said sealable sliding movement of said inlet port between its said regulating and flushing positions.

4. The pressure regulator of claim 3 wherein said housing includes a lever actuated cam for effecting movement of said inlet port between its said regulating and flushing positions.

5. A pressure regulator for a drinking system for poultry or other animals; the drinking system including a water supply line, said regulator, and a watering pipe with drinking stations positioned therealong; said pressure regulator including:

a housing having a chamber therewithin;

a flexible diaphragm sealed with respect to said housing and dividing said chamber into a water chamber and an ambient chamber;

a spring carried by said housing in operable engagement with said diaphragm such that the force of said spring acts upon said diaphragm to force said diaphragm toward said water chamber;

said housing having a water inlet adapted to be connected to a supply line and an outlet adapted to be connected to said watering pipe, said inlet and said outlet being in communication with said water chamber, said inlet having a single inlet port through which water enters said water chamber, a valve carried by said housing and being operatively associated with said diaphragm for movement between a closed position in which said valve blocks the flow of water from said inlet port into said water chamber and an open position in which water is permitted to flow from said inlet port into said water chamber such that the force of said spring acting on the atmosphere side of said diaphragm balances the force exerted on the water side of said diaphragm thereby to regulate the pressure of the water in said water chamber and within said watering pipe to a predetermined water pressure substantially less than the pressure of said water supply, the positions of said inlet port and said valve member relative to each other being selectively alterable to selectively switch said regulator between an operating mode in which said regulator operates to reduce pressure of water entering said watering pipe and a flushing mode in which water at line pressure enters said watering pipe.

6. The pressure regulator of claim 5 wherein said water inlet comprises a tube; said water inlet comprising an opening at an end of said tube; said tube being movably mounted in said regulator housing to be movable relative to said valve member to selectively move said regulator between said operating mode and said flushing mode.

7. The pressure regulator of claim 6 wherein said tube is movable axially; said tube being movable between a raised position to place said regulator in said flushing mode and a lowered position to place said regulator in said operating mode.

8. The pressure regulator of claim 7 including a lever which moves said tube between said raised and lowered positions.

9. The pressure regulator of claim 7 wherein said tube is received in a sleeve on said housing; one of said tube and said sleeve having a spiral groove; the other of said tube and sleeve including a finger which engages said spiral groove; said tube being movable between said raised and lowered positions upon rotation of said tube.

10. The pressure regulator of claim 6 wherein said diaphragm is movable within said housing upwardly and downwardly in response to changes in water pressure within said water chamber, said regulator including a stop in said ambient chamber engageable with said diaphragm when the latter is in its lowermost position to support said diaphragm when said regulator is in its flushing mode.

11. The pressure regulator of claim 10 including a support plate in said ambient chamber; said support plate being movable with said diaphragm in said housing chamber and being engageable with said stop thereby to support said diaphragm.

12. The pressure regulator of claim 11 wherein said stop includes a sleeve extending upwardly into said ambient chamber from a bottom of said housing.

13. A pressure regulator for a drinking system for poultry or other animals; the drinking system including a water supply line, said regulator, and a watering pipe with drinking stations positioned therealong; said pressure regulator including:

a housing having a chamber therewithin;
a flexible diaphragm sealed with respect to said housing and dividing said chamber into a water chamber and an ambient chamber in communication with the atmosphere;
a spring carried by said housing in operable engagement with said diaphragm such that the atmosphere and the force of said spring acts upon said diaphragm to force said diaphragm toward said water chamber;
said housing having a water inlet adapted to be connected to a supply line and an outlet adapted to be connected to said watering pipe, said inlet and said outlet being in communication with said water chamber, said inlet having a single inlet port through which water enters said water chamber;
a valve carried by said housing and being movable with said diaphragm between a closed position in which said valve blocks the flow of water from said inlet port into said water chamber and an open position in which water is permitted to flow from said inlet port into said water chamber such that with said spring adjusted to a predetermined level the force of said spring and of the atmosphere acting on the atmosphere side of said diaphragm balances the force exerted on the water side of said diaphragm thereby to regulate the pressure of the water in said water chamber and within said watering pipe to a predetermined water pressure substantially less than the pressure of said water supply; and
means for altering the position of said water inlet port relative to said valve member to selectively switch said regulator between an operating mode in which said valve member and water inlet port are positioned relative to each other such that said valve member can open and close said port to reduce pressure of water entering said watering pipe to said predetermined water pressure and a flushing mode in which said valve member and water inlet port are positioned relative to each other such that said valve member is inoperable to close said inlet channel port thus permitting water at line pressure to enter said water chamber and said watering pipe.

14. The pressure regulator of claim 13 wherein said altering means comprises a tube; said water inlet port comprising an opening at an end of said tube; said tube being movably mounted in said regulator housing relative to said valve member between said operating mode and said flushing mode.

15. The pressure regulator of claim 14 wherein said housing has a fitting for slidably, sealably receiving said tube, and wherein said tube is movable axially between a raised position to effect operation of said regulator in said flushing mode and a lowered position to place said regulator in said operating mode.

16. The pressure regulator of claim 15 including a lever operated cam carried by said housing and a cam follower on said tube for effecting axial movement of said tube between said raised and lowered positions.

17. The pressure regulator of claim 15 wherein one of said tube and said fitting having have a spiral groove and the other of said tube and fitting including a finger which engages said spiral groove such that said tube is axially movable between said raised and lowered positions upon rotation of said tube.

18. In a drinking system installed in building for poultry or other farm animals; said drinking system including a water inlet line; a water pipe; a plurality of drinking stations along said water pipe; and a pressure regulator positioned between said water inlet line and said water pipe; said pressure regulator including a housing having an inlet in communication with said water inlet line and an outlet in communication with said water pipe; a support member coupled to said water pipe so as to stabilize or stiffen said water pipe said regulator housing being connected to support member and said water pipe, the improvement comprising a mounting bracket for suspending said regulator and for securely coupling said support member to said housing; said mounting bracket including;

a base securable to said housing;

a first arm and a second arm extending from said base, said first and second arms being sized and shaped to define a passage for receiving said support member;

a finger extending from each said arm, said fingers being adjacent each other and connectable together to draw said first and second arms into gripping engagement with said support members, said fingers being connectable to a respective cable depending from a support structure in said building so as to suspend said water pipe and said regulator from said support structure whereby said regulator can be removed from said mounting bracket without disconnecting said mounting bracket from said support pipe to maintain connection of said support pipe to said cable.

19. The improvement of claim 18 wherein said bracket is stamped from a single piece of sheet metal.

20. The improvement of claim 18 wherein said support member is a pipe.

* * * * *